G. H. MILLEN.
Machine for Heading Friction Matches.

No. 223,601.　　　　Patented Jan. 13, 1880.

UNITED STATES PATENT OFFICE.

GEORGE H. MILLEN, OF HULL, QUEBEC, CANADA, ASSIGNOR TO EZRA BUTLER EDDY, OF SAME PLACE.

MACHINE FOR HEADING FRICTION-MATCHES.

SPECIFICATION forming part of Letters Patent No. 223,601, dated January 13, 1880.

Application filed June 18, 1879. Patented in Canada, February 18, 1879.

*To all whom it may concern:*

Be it known that I, GEORGE HENRY MILLEN, of Hull, in the county of Ottawa, in the Province of Quebec, Canada, have invented certain new and useful Improvements on Machines for Heading Friction-Matches; and I do hereby declare that the following is a full, clear, and exact description of the same.

This invention relates to a machine in which the splints in frames, rolls, racks, cards, or bunches are passed over a heated cylinder partly revolving in a trough containing the chemical compound, which is heated by steam and water, whereby the ends of the splints have transferred to them a portion of the chemical compound adhering to the surface of the revolving cylinder.

My invention consists of a hollow cylinder mounted on a frame having a double-walled trough, in which the cylinder partly rotates in contact with the chemical compound contained in the trough, said cylinder having steam-pipes connecting with its hollow journals, and the trough heated by steam brought into contact with water between the double walls, whereby the chemical compound is kept in the trough in a melted state, and taken up by the heated cylinder to be partly transferred to the ends of the splints or matches in frames, rolls, racks, cards, or bunches passed over the surface during its rotation.

Figure 1:
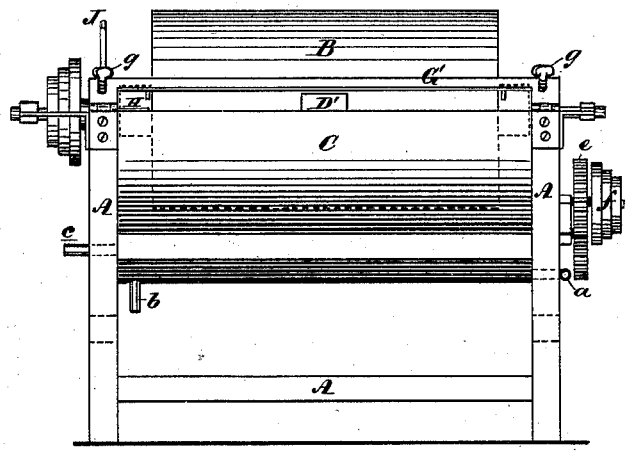
Figure 2:
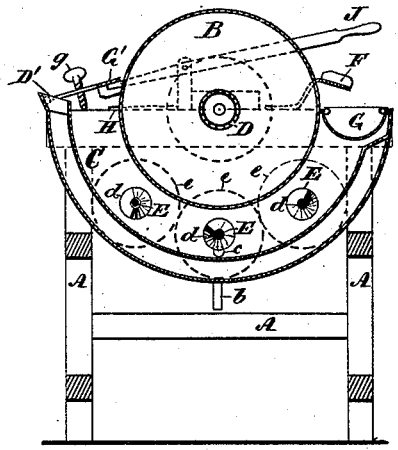
Figure 3:
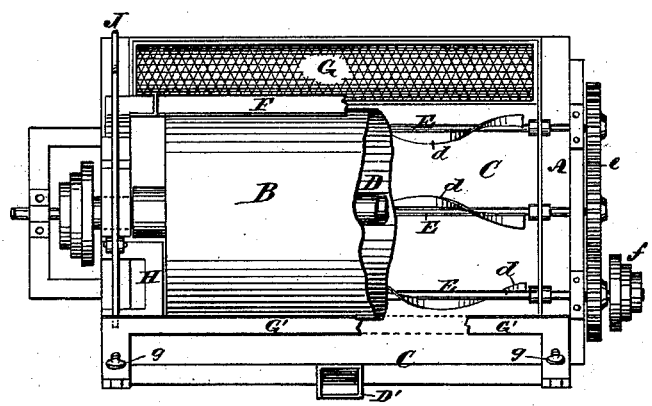

Figure 1 is a side view, Fig. 2 a transverse section, and Fig. 3 a top view, of my machine.

A is a suitable rectangular frame or stand, on which is mounted, by hollow journals, a hollow cylinder, B, which partly revolves in a double-walled trough, C, which is secured to the frame A.

D represents a pipe or pipes connecting the hollow journals of the cylinder B, to heat the surface of the cylinder B by the passage of steam through the pipe, whereby the chemical compound on the cylinder is kept in a melted state, to adhere to the ends of the splints which are passed over the surface of the cylinder, the splints being held in suitable frames, rolls, racks, cards, or bunches.

The cylinder B is mounted to partly rotate in trough c in contact with the chemical compound, which is held in a state of liquefaction by heat communicated by means of water between the double walls of the trough and steam admitted through the inlet a.

D' is an inlet water-aperture to the double walls, and b a pipe for exhausting the contents. c is a pipe for exhausting the trough of chemical compounds.

E are shafts journaled in the ends of the trough, and have spiral vanes d, or other suitable means, which keep the chemical contents in agitation. These shafts are operated by gear-wheels e, meshing together, and driven by a belt on the speed-pulley f at the end of one of the shafts.

F is a scraper-bar, secured at the ends to the frame A at a suitable distance from and longitudinal with the cylinder B, to clear its surface of chemical compound at each revolution, and to guide it into a sieve, G, which catches the chips and other foreign matter, the chemical compound descending into the trough to be again taken up by the cylinder.

G' is a gage-bar, hinged at both ends to the frame A, adjustably set by the screws g, to give the desired uniform thickness to the compound adhering to the cylinder.

The bar G' is raised by a lever, J, to allow foreign matter to pass and to be caught by the scraper F, for clearing the trough of foreign matter when desired.

H are scrapers secured to the frame A, to prevent the accumulation of matter at the ends of the cylinder.

I disclaim the machines described in the patent granted to C. F. Bonhack, August 5, 1872, and to S. A. Bell and Thomas Higgins, jointly, June 16, 1863; but

I claim as my invention—

The hereinbefore-described machine for heading friction-matches, consisting of the frame A, having gage-bar G', scrapers F H H, and lever J, double-walled trough C, having sieve G, geared shafts E E E, with agitators d, and hollow cylinder B, having hollow journals and internal heating-pipe, D, as described, for the purpose set forth.

GEO. H. MILLEN.

Witnesses:
JOHN GRIST,
F. J. ROSS.